(12) United States Patent
Gottschalk et al.

(10) Patent No.: US 6,356,798 B1
(45) Date of Patent: Mar. 12, 2002

(54) METHOD OF OPERATING A MACHINE FOR CUTTING STACKS OF MATERIAL IN SHEETS

(75) Inventors: Gerd Gottschalk, Kelkheim-Fischbach; Horst Schneider, Hofheim/Taunus, both of (DE)

(73) Assignee: Adolf Mohr Maschinenfabrik GmbH & Co. KG, Hofheim am Taunus (DE)

( * ) Notice: Subject to any disclaimer, the term of this patent is extended or adjusted under 35 U.S.C. 154(b) by 0 days.

(21) Appl. No.: 09/249,952

(22) Filed: Feb. 12, 1999

(30) Foreign Application Priority Data

Mar. 12, 1998 (DE) .......................... 198 10 744

(51) Int. Cl.[7] .............. G06F 7/66; D21F 7/02; B26D 5/20
(52) U.S. Cl. .................. 700/127; 162/262; 83/76.1
(58) Field of Search .................. 700/127–129, 700/167, 180, 188; 162/194, 262, 286; 83/76.1, 76.3–76.7, 76.9, 84

(56) References Cited

U.S. PATENT DOCUMENTS

| | | | | |
|---|---|---|---|---|
| 3,623,619 A | * | 11/1971 | Loper | .................. 214/1.6 |
| 4,327,615 A | * | 5/1982 | Gerber et al. | .................. 83/49 |
| 4,331,050 A | * | 5/1982 | Gergek | .................. 83/76.7 |
| 4,445,409 A | * | 5/1984 | Mohr et al. | .................. 83/157 |
| 5,418,729 A | * | 5/1995 | Holmes et al. | .......... 364/474.09 |

* cited by examiner

*Primary Examiner*—William Grant
*Assistant Examiner*—Elliot Frank
(74) *Attorney, Agent, or Firm*—Max Fogiel

(57) ABSTRACT

A method of operating a machine for cutting stacks of material in sheets. The machine's basic settings are established in accordance with parametric settings (machine parameters). Specific parameters (program parameters) are permanently assigned to an overall material-cutting program. Individual parameters (routine parameters) are permanently assigned to paper-cutting routines within the overall program. The machine parameters are stored and remain valid until modified or replaced by specifically requested routine parameters. The routine parameters are stored and remain valid until modified.

The method allows the operation of the machine to be adapted to the various conditions that occur during the job.

18 Claims, 2 Drawing Sheets

METHOD OF OPERATING A MACHINE FOR CUTTING STACKS OF MATERIAL IN SHEETS

BACKGROUND OF THE INVENTION

The present invention concerns a method of operating a machine for cutting stacks of material in sheets. The machine's basic settings are established in accordance with parametric settings called machine parameters hereinafter.

A machine for cutting stacks of material—paper, card, and similar material in particular—is known from EP 0 056 874 A2.

Once the machine parameters have been correctly established in such a machine, even relatively untrained people can use it properly without having to change the basic settings. The basic settings concern, for example, the speed of the saddle that advances the material being cut, the operation of the accelerating and decelerating ramps in conjunction with the advance of the saddle, the pressure exerted by the holdfast that secures the material in the vicinity of the cutting plane, etc. A machine with its basic settings established by way of the machine parameters alone, however, seldom cuts satisfactorily in individual cases. A wider stack of material must for example be subjected to higher pressure than a narrower stack. The stack-forwarding saddle can also be decelerated more rapidly by a larger stack than by a small stack. Optimizing the performance of a sheet-cutting machine by allowing the machine parameters to vary with the particular application has already been proposed. In this event of course, all other steps in the process will need to conform to the modified parameters. The results are not satisfactory because the operator must constantly readjust the machine to ensure proper cutting results case by case.

German GM 8 604 773 describes a computer-controlled paper cutter. Data and commands associated with the processing of paper by such a machine can be stored in an external memory. The memory is just an ordinary magnetic-tape cassette that programs comprising data and commands can be stored on. The machine can also supply reference data to the tape, allowing the programming to be modified. An advantage is that the same data can be employed for billing by obtaining them from the memory once a job has been completed.

A paper cutter with data storage is known from German OS 2 752 418. The memory is part of the processor that controls the machine. It comprises a permanent memory that stores the machine-control program and a variable memory that stores the data for the particular job. Reference data and particular functions can be selected from the data memory by way of a keyboard and deleted, replaced, or added to as desired.

SUMMARY OF THE INVENTION

The object of the present invention is an improved method of the aforesaid genus that will allow the operation of the machine to be adapted to the various conditions that occur during the job.

This object is attained in accordance with the present invention in that specific parameters (program parameters) are permanently assigned to an overall material-cutting program and in that individual parameters (routine parameters) are permanently assigned to paper-cutting routines within the overall program, whereby the machine parameters are stored and remain valid until modified or replaced by specifically requested routine parameters, and whereby the routine parameters are stored and remain valid until modified.

DESCRIPTION OF THE PREFERRED EMBODIMENTS

Figure 1:
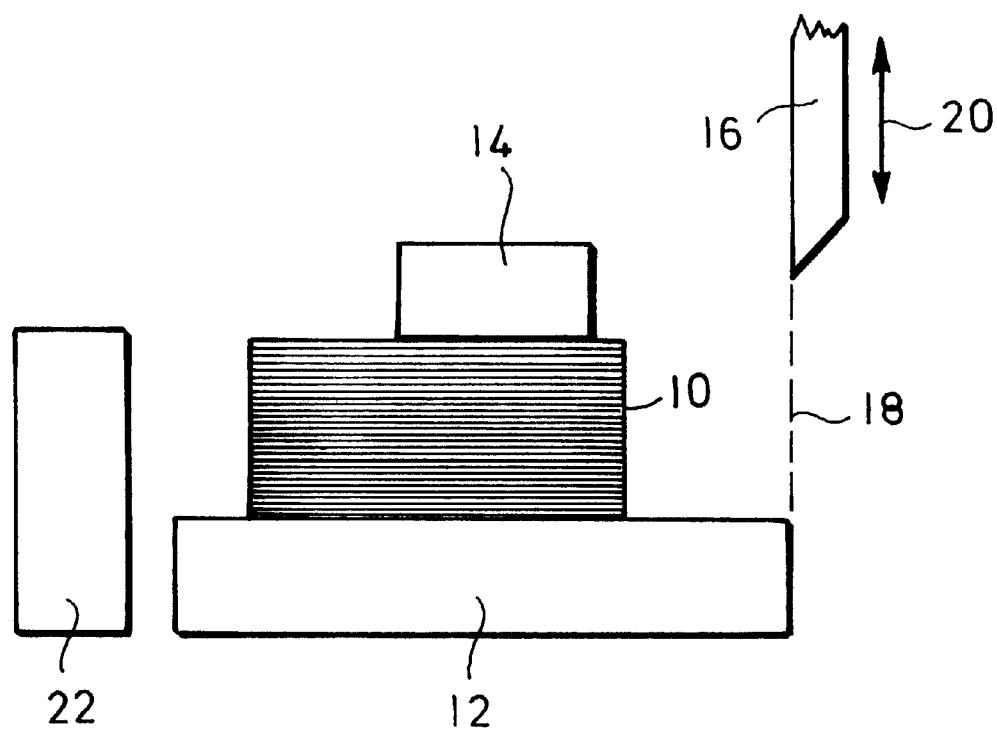
FIG. 1 is a schematic block diagram of some essential elements of the present invention.
Figure 2:
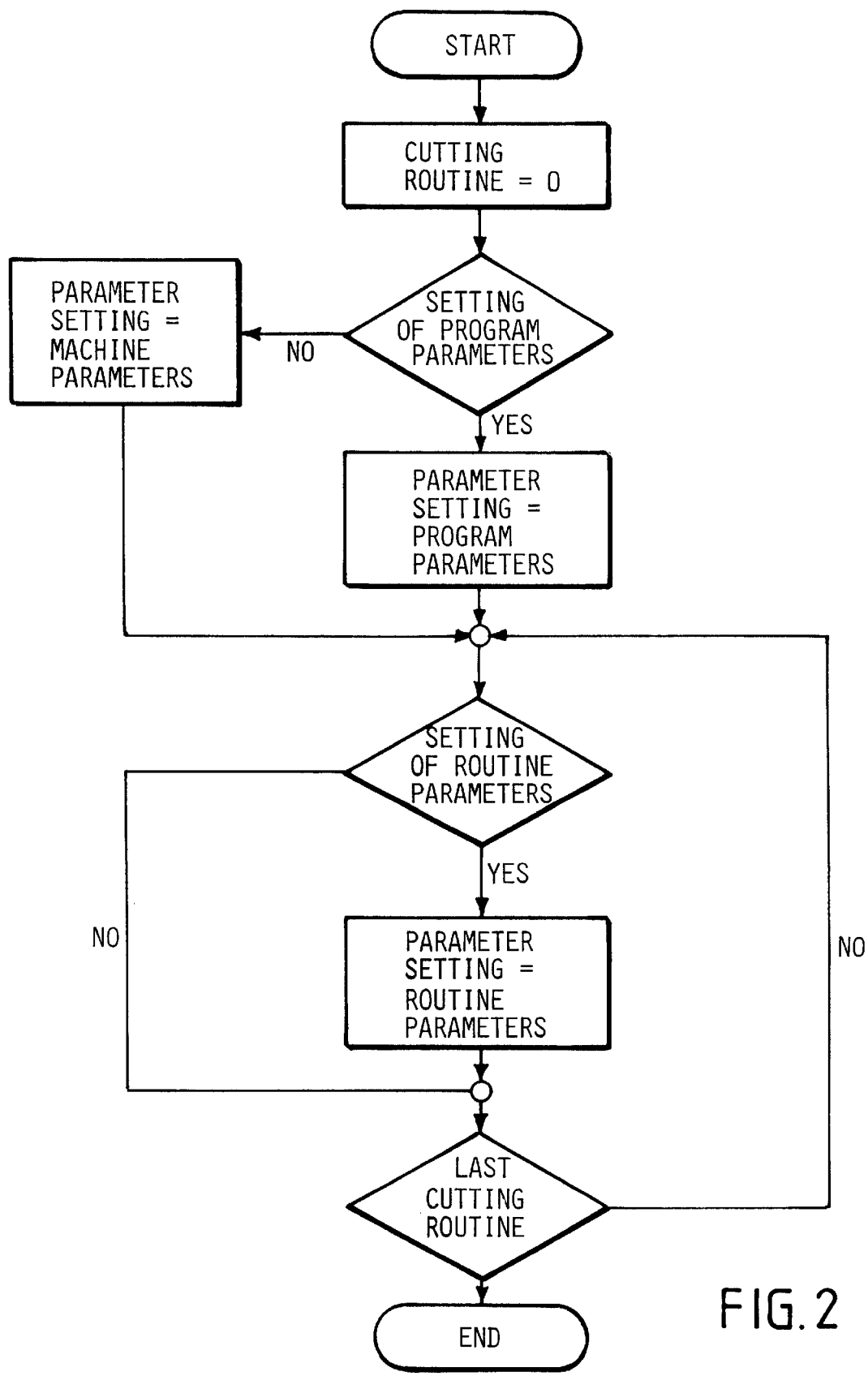
FIG. 2 is a schematic block diagram showing the steps of the method in accordance with the present invention.

Referring to FIG. 1, a stack of sheets 10 to be cut rests on a support or saddle 12. The saddle 12 moves the stack 10 toward the cutting blade 16. A holdfast or clamping device 14 applies pressure to the stack of sheets to hold them in place and prevent shifting of the sheets. The cutting edge of the blade moves up and down in the cutting plane 18 through the stroke 20. A source of compressed air removes dust generated by the cutting process.

The machine parameters are accordingly employed to establish the basic settings. A satisfactory basic setting will as hereintofore mentioned allow even relatively untrained personnel to operate the machine correctly without having to make any adjustments. The program parameters are then employed to permanently establish the individual-job settings. A material-cutting program with program parameters assigned to it will ensure during the operation that the machine is automatically adjusted optimally to the particular job. This function is particularly helpful for repeat jobs. The settings are stored in association with the particular program and will remain valid until modified or replaced by activated routine parameters.

The material being cut can vary while a material-cutting program is being run. A selected parameter may cease to be optimal at a particular point, and a different one may substantially facilitate the job. The routine parameters will in this event be employed to assign specific settings to a material-cutting routine. The machine can accordingly be entirely reconfigured from routine to routine if desired. Once the routine parameters have been entered, the machine's settings will be automatically adjusted to any changes that occur in the material being cut during the operation. The settings will be stored in association with the particular routine and will remain valid until modified.

In contrast to the state of the art, where all steps in the method are subject to particular changes in settings, the changes in individual parameters are, in accordance with the present invention, valid only for the particular program or routine.

If an operator is assigned a repeat job with the same sequence of steps wherein stacks of different width are to be both sheared and slit for example, he can change both the routine parameters and the machine parameters. The revised parameters will remain valid for all the routines in the job. The revised parameters may concern for example accelerating or decelerating the stack-forwarding saddle or maintaining its speed constant, varying how much force is to be exerted for how long by the holdfast before or while the material is being cut, or the speed of the blade. They will be valid for all the cutting routines in the program. In this context "cutting routine" shall be construed to mean the total mass to be exerted in producing the cut. The overall program will include several cutting routines, The ability to select different program parameters ensures more satisfactory cuts than could be achieved with the basic settings, the machine parameters, alone and the results can be improved even further. If the operator decides to continue the program with other parameters, he can modify the list of routine parameters. This means that he can vary every cutting routine in the program in accordance with his particular conception of what is going on. He may notice for example that the a particular parameter, that associated with holdfast force for instance, has changed. It will accordingly be possible to create a specific material advance-and-cutting program with individually adjustable cutting and accessory parameters.

Although the parametric settings in the lists of machine parameters, program parameters, and routine parameters primarily concern accelerating or decelerating the stack-forwarding saddle or maintaining its speed constant, varying how much force is to be exerted for how long by the holdfast before or while the material is being cut, or the speed of the blade, they are not limited thereto. The parametric settings can also concern such additional parameters in conjunction with machine operation as turning a source of compressed air on and off to remove any waste deriving from an intermediate paper-cutting process through a slot left between the front and rear sections of the stack-supporting surface as described in EP 0 056 874 A2. A parametric setting can also concern parameters associated with optimization of the stroke traveled by the holdfast and/or blade.

Machine, program, and routine parameters can be directly entered manually at the paper-cutting machine itself or, in the event of automatic paper-cutting program generation, provided automatically, in which case the operator will need to make no further adjustments, and the machine will always be optimized for the particular job.

The following lists are intended to provide a general survey of some of the available paper-cutting machine parameters.

I. Machine parameters
Holdfast-pressure duration prior to cutting
Holdfast-pressure duration with no cutting
Holdfast-pressure increment
Holdfast-pressure sensors
Holdfast-pressures table
Saddle-advance acceleration
Saddle-advance deceleration
Constant saddle-advance speed
Shock-absorbed saddle deceleration
Compressed air ON and OFF
Compressed air START and STOP
Holdfast optimization
Holdfast light barrier ON and OFF
Gentle preliminary holdfast pressure
Rapid cut
Parameter list copy II. Program parameters
Holdfast-pressure duration prior to cutting
Holdfast-pressure duration with no cutting
Holdfast-pressure increment
Holdfast-pressure sensors
Holdfast-pressures table
Saddle-advance acceleration
Saddle-advance deceleration
Constant saddle-advance speed
Shock-absorbed saddle deceleration
Compressed air ON and OFF
Compressed air START and STOP
Holdfast optimization
Holdfast light barrier ON and OFF
Gentle preliminary holdfast pressure
Rapid cut
Parameter list copy Holdfast-pressure duration prior to cutting concerns how long the holdfast will hold the material in place prior to cutting it. Holdfast-pressure duration with no cutting concerns how long the holdfast will hold the material in place when no cutting occurs. This operation is employed when there is air between the sheets in a stack and it needs to be forced out. Holdfast-pressure increment concerns establishing various levels of holdfast pressure. The holdfast-pressure sensors are the sensors that detect the width of a stack resting on the stack-support surface. This parameter automatically adjusts the pressure exerted by the holdfast. Holdfast-pressures table relates to selecting a parameter from a table. Saddle-advance acceleration concerns accelerating the saddle into the cutting position. Saddle-advance deceleration concerns selecting a deceleration from prescribed performance curves. Constant saddle-advance speed is employed to select various speeds for the advancing and retracting saddle. Shock-absorbed saddle deceleration will brake the saddle gradually, which is particularly important when the paper being cut is especially smooth. When compressed air ON and OFF or START and STOP is activated, the source of air employed to remove waste will be turned on and off at regular intervals or started and stopped as necessary. Holdfast optimization will ensure that the holdfast is not entirely disengaged subsequent to a cutting operation but only to a certain degree, allowing the material being cut to be introduced smoothly below it. This procedure will accelerate the overall operation. A holdfast light barrier having ON and OFF states activates and de-activates the holdfast which also ensures that the holdfast is not fully raised. Gentle preliminary holdfast pressure ensures that the holdfast will not press too tightly against the material being cut. This parameter is employed in particular with sensitive material, especially material with a highly processed surface, to prevent displacement of individual sheets in the stack as the holdfast descends. In rapid cut, a sensor on the holdfast detects the position of the blade in relation to the holdfast and releases the blade when the edge of the blade is slightly above the bottom of the holdfast, so that the next cutting procedure can be initiated rapidly while the stack is already in motion. Parameter list copy allows an already established parameter list to be copied for use in subsequent programs or routines.

What is claimed is:

1. A method of operating a machine for cutting stacks of material in sheets, comprising the steps of: establishing the machine's basic settings in accordance with parametric settings comprising machine parameters; assigning program parameters permanently to an overall material-cutting program, individual routine parameters being permanently assigned to paper-cutting routines within said overall material cutting program; storing said machine parameters and retaining said machine parameters valid until modified or replaced by specifically requested routine parameters, said routine parameters being stored and remaining valid until modified, said routine parameters being dependent on dimensional characteristics as well as material substance characteristics of stacks of sheets to be cut.

2. A method as defined in claim 1, including the step of advancing the material to be cut into a cutting position before being cut and then holding said material clamped in vicinity of a cutting plane, said material being cut while being held clamped, said parametric settings being dependent on dimensions specific to advancing, clamped fast holding and cutting the material.

3. A method as defined in claim 2, wherein said parametric settings depend on acceleration of a support advancing the material being cut.

4. A method as defined in claim 2, wherein said parametric settings depend on deceleration of a saddle advancing the material being cut.

5. A method as defined in claim 2, wherein said parametric settings depend on speed of a saddle advancing the material being cut.

6. A method as defined in claim 3, wherein said parametric settings depend on how long a holdfast clamp will hold the material fast.

7. A method as defined in claim 3, wherein said parametric settings depend on how much force a holdfast will exert on the material.

8. A method as defined in claim 3, wherein said parametric settings depend on a stroke of travel of a holdfast.

9. A method as defined in claim 2, wherein said parametric settings depend on how rapidly a blade will move when cutting the material.

10. A method as defined in claim 2, wherein said parametric settings depend on a stroke traveled by a blade in cutting the material.

11. A method as defined in claim 2, wherein said parametric settings depend on further parameters associated with operating the machine and comprising activating a source of compressed air.

12. A method as defined in claim 1, wherein a program can be entered directly at the machine.

13. A method as defined in claim 1, wherein routine parameters can be entered directly at the machine.

14. A method as defined in claim 1, wherein the machine parameters can be entered directly at the machine.

15. A method as defined in claim 1, wherein the machine parameters are generated externally.

16. A method as defined in claim 1, wherein program parameters are generated externally.

17. A method as defined in claim 1, wherein routine parameters are generated externally.

18. A method of operating a machine for cutting stacks of material in sheets, comprising the steps of: establishing the machine's basic settings in accordance with parametric settings comprising machine parameters; assigning program parameters permanently to an overall material-cutting program, individual routine parameters being permanently assigned to paper-cutting routines within said overall material cutting program; storing said machine parameters and retaining said machine parameters valid until modified or replaced by specifically requested routine parameters, said routine parameters being stored and remaining valid until modified, said routine parameters being dependent on dimensional characteristics as well as material substance characteristics of stacks of sheets to be cut; advancing the material to be cut into a cutting position before being cut and then holding said material clamped in vicinity of a cutting plane, said material being cut while being held clamped, said parametric settings being dependent on dimensions specific to advancing, clamped fast holding and cutting the material; said parametric settings depending on acceleration of a support advancing the material being cut, said parametric settings depending also on how long a holdfast clamp will hold the material fast, said parametric settings depending also on how rapidly a blade will move when cutting the material, said parametric settings depending also on further parameters associated with operating the machine and comprising activating a source of compressed air, a program being also enterable directly at the machine, the machine parameters being generated externally.

\* \* \* \* \*